United States Patent [19]

Cruzan, II

[11] 4,363,469
[45] Dec. 14, 1982

[54] CUTTING TORCH GUIDE

[76] Inventor: Robert E. Cruzan, II, R.R. #2, Box 87D, Arcadia, Ind. 46030

[21] Appl. No.: 286,326

[22] Filed: Jul. 24, 1981

[51] Int. Cl.³ .............................................. B23K 7/10
[52] U.S. Cl. ................................................... 266/77
[58] Field of Search ................................... 266/77, 48

[56] References Cited

U.S. PATENT DOCUMENTS

| | | | |
|---|---|---|---|
| 1,370,882 | 3/1921 | Crandall | 266/77 |
| 1,658,064 | 2/1928 | Stine | 266/77 |
| 1,694,567 | 12/1928 | Stine | 266/77 |
| 1,696,916 | 1/1929 | Kutscheid | 266/77 |
| 2,413,117 | 12/1946 | Smith | 266/48 |
| 2,582,011 | 1/1952 | Cunningham | 266/48 |
| 3,357,690 | 12/1967 | Firestone | 266/48 |

Primary Examiner—W. Stallard
Attorney, Agent, or Firm—John H. Calhoun, Jr.

[57] ABSTRACT

A screw operated cutting torch guide comprising an upward opening channel or other suitable structural member that is closed at its ends by end plates and having one of a pair of interchangeable threaded rods or screws mounted lengthwise therein. Each threaded rod is mounted for rotational movement about its longitudinal axis in the end plates. One of the rods is adapted for operation by a power drill and the other is adapted for hand operation. A torch holder assembly, capable of vertical and angular adjustment, and adapted for receiving a cutting torch attached thereto, is mounted on the threaded rod for reciprocating lengthwise movement within the said channel.

1 Claim, 8 Drawing Figures

CUTTING TORCH GUIDE

BACKGROUND OF THE INVENTION

This invention relates to mechanical guiding devices and more particularly to guides for guiding a flame tip of a cutting torch in a straight line. Cutting torch guides of several kinds are known in the prior art. U.S. Pat. No. 2,368,967 issued on Feb. 6, 1945 to C. R. Burton shows an attachment for a torch burning machine designed for adjusting a manual tracer inward or outward on a table when cutting concentric circles. U.S. Pat. No. 2,465,413 issued on Mar. 29, 1949 to R. L. York shows a cutting torch guide device for guiding a tip of a cutting torch in a straight line and in a variety of predetermined angles. U.S. Pat. No. 2,475,891 issued on July 12, 1949 to E. E. Harris shows a six wheeled guide for cutting torches having four carriage wheels adapted to ride on a surface of metal to be cut, a leading guide wheel adapted to follow a line on the surface of the work, and a trailing guide wheel adapted to ride in a trench cut out by the torch. U.S. Pat. No. 2,514,741 issued on July 11, 1950 to L. K. Bullman et. al. shows a cutting torch holder adapted for angular and vertical adjustment of a cutting tip. U.S. Pat. No. 2,813,710 issued on Nov. 19, 1957 to R. O. Angle shows a magnetically supported guide bar for cutting torches. The guide bar may be straight or curved. U.S. Pat. No. 3,734,477 issued on May 22, 1973 to Nick Enfantino shows a torch guide adapted to be used in combination with a hand held square.

SUMMARY OF THE INVENTION

The guide of the present invention has all of the advantages of cutting torch guides known in the art and in addition provides several distinct and important advantages not provided by existing guides. One object of the present invention is to provide a guide that can be operated by a power source such, for example, as a power drill. Another object of the present invention is to provide a guide that can be operated by hand. Another object of the present invention is to provide a guide wherein the height and cutting angle of a cutting torch may be quickly, easily and reliably adjusted. Another object of the present invention is to provide a guide that is simple in construction, inexpensive, strong and durable, reliable, and well adapted for the purpose for which it is designed. Other objects and advantages of the present invention will become apparent from a consideration of the following detailed description taken in connection with the accompanying drawings wherein a preferred embodiment of the invention as shown. It should be understood that the invention is not limited to the details disclosed, but includes all such variations and modifications as fall within the spirit of the invention and the scope of the appended claims.

The objects of the present invention are accomplished by providing an upward opening channel that is closed at both ends by end plates, which plates support a threaded rod that extends lengthwise within the channel. A cutting torch support assembly is mounted on the threaded rod for reciprocating lengthwise movement within the channel. A cutting torch may be detachably coupled to the cutting torch support assembly, which has provisions for adjusting the height and cutting angle of the torch. In a preferred embodiment of my invention, two interchangeable threaded rods are provided, one of which is adapted to be driven by a power drill and the other of which is adapted to be hand driven. A threaded rod mounted within the channel and having a torch support assembly mounted thereon is rotated about its longitudinal axis to produce linear movement of the torch support assembly and the torch mounted thereon.

BRIEF DESCRIPTION OF THE DRAWINGS

A preferred embodiment of the cutting torch guide of the present invention is illustrated in the accompanying drawings, in which.

DESCRIPTION OF THE PREFERRED EMBODIMENT

Figure 1:
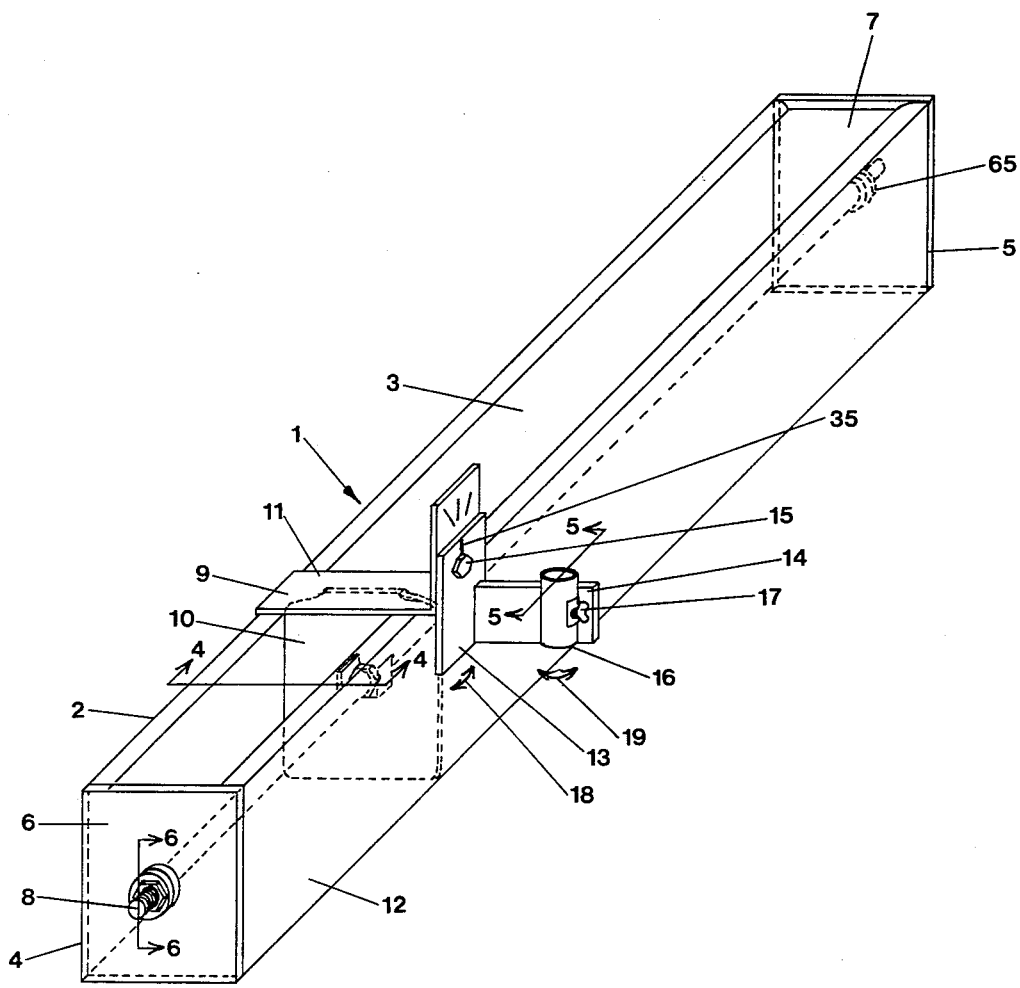
FIG. 1 is a view in perspective of a torch guide of the present invention.

Referring now to the drawings in greater detail, FIG. 1 illustrates a torch guide of the present invention wherein the guide 1 comprises a channel 2 or other suitable structural member open at the top 3 and closed at two ends 4, 5 by end plates 6, 7; a threaded rod 8 mounted and extending lengthwise within the channel 2 and supported for rotational movement about its longitudinal axis in the two end plates 6, 7; and a torch holder assembly 9 mounted on the aforesaid threaded rod 8 for reciprocating lengthwise movement within the aforesaid channel 2. The torch holder assembly 9 comprises a guide block 10 to which and L-shaped torch support bracket 11 is rigidly fixed by welding or other suitable means. The bracket 11 is positioned across and above the top 3 of the channel 2 and extends over a side 12 of the said channel 2. A rotatable plate 13 having a horizontally extending support bar 14 rigidly fixed thereto is detachably coupled by a bolt 15 or other suitable means to the aforesaid bracket 11. A tiltable tubular member 16 having a set screw 17 provided therein is detachably coupled to the aforesaid bar 14.

A cutting torch (not shown) of conventional construction is inserted vertically with its tip end down in the tubular member 16 and is held in position by the set screw 17. To adjust the cutting angle, the rotatable tubular member 16 is rotated clockwise or counterclockwise in the directions indicated by arrow 19. To adjust the height of the flame tip, the bolt 15 is loosened; the rotatable plate 13 rotated clockwise or counterclockwise on the shaft of the bolt 15 in the directions indicated by arrow 18; and the bolt 15 again tightened. The torch, thus supported in the torch holder assembly 9, may be moved in either direction in a straight line parallel with the longitudinal axis of the rod 8 by rotating the rod 8 clockwise or counter-clockwise about its said axis in a manner fully described below.

Figure 2:
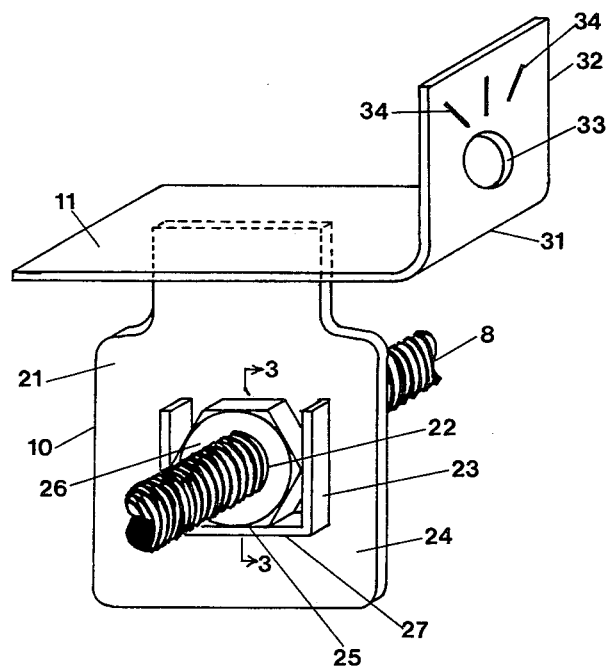
FIG. 2 is a view in perspective of a torch holder assembly.
Figure 3:
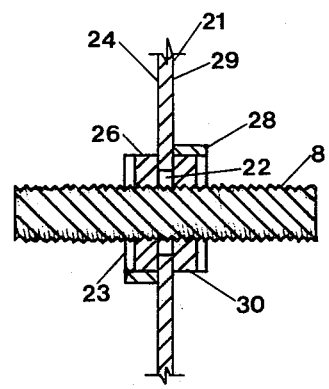
FIG. 3 is a cross-sectional view illustrating the method for mounting a torch holder assembly on a threaded rod.

A guide block 10, torch support bracket 11, and threaded rod 8 are shown in greater detail in FIG. 2. In the illustrated embodiment, the guide block 10 comprises a flat, key shaped, vertical plate 21 stamped or otherwise fabricated from steel or other suitable stock material, having therethrough an unthreaded hole 22 larger in diameter than the diameter of the threaded rod 8. An upward opening channel-like nut-stop 23 is welded, brazed or otherwise suitably attached to one face 24 of the plate 21 below the hole 22 a distance chosen such that a flat 25 of a hexigonal or other rod support nut 26 will be restrained from rotating by the bottom 27 of the nut-stop 23 when the nut 26 is threaded onto the rod 8 and the rod 8 is inserted through the hole 22 in the plate 21 and the nut 26 is seated against the face 24 thereof. An identical but downward opening channel-like nut-stop 28 is attached to the opposing face 29 of the plate 21 above the hole 22 to prevent a second rod support nut 30 from rotating when threaded onto the rod 8 and seated against the opposing face 29 of the plate 21. As illustrated in FIG. 3, wear of the plate 21 around the hole 22 is prevented by making the hole 22 larger in diameter than the diameter of the rod 8, attaching the first nut-stop 23 high enough on the plate 21 to prevent the rod 8 from coming into contact with the bottom of the hole 22, and attaching the second nut-stop 28 low enough on the plate 21 to prevent the rod 8 from coming into contact with the top of the hole 22 when the two nuts 26, 30 are seated against opposing faces 24, 29 of the plate 21 and the rod 8 is threaded through the said nuts 26, 30. The nut-stops 23, 28 are made just wide enough to receive the nuts 26, 30 snuggly but removeably inserted therein, thereby preventing lateral movement of the rod 8 within the hole 22. As can be readily seen, through proper material selection parts wear that might occur due to repeated movement of the torch holder assembly 9 along the rod 8 may be limited to the inexpensive and easily replaceable nuts 26, 30.

Figure 4:
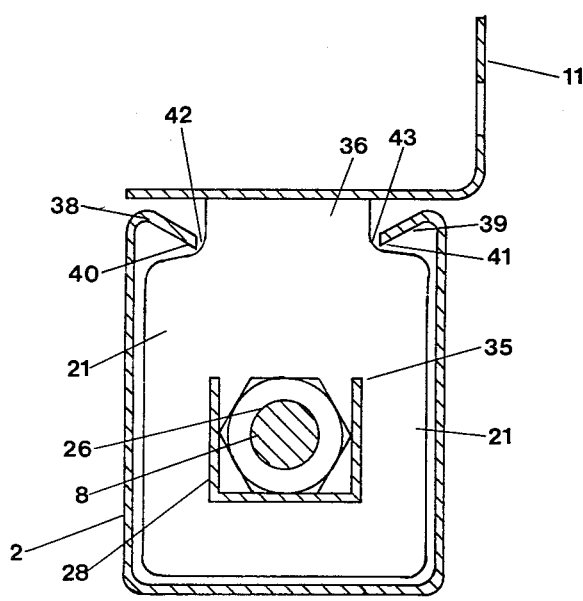
FIG. 4 is a cross-sectional view showing the location of a guide block within a channel.

Referring now to FIG. 4, the top edges 38, 39 of the channel 2 are folded inward and downward along the lengths thereof to form guide rails 40, 41. The lower portion 35 of the plate 21 is made wider than the lateral distance between the two guide rails 40, 41 and the upper portion 36 thereof is reduced in width so that the upper portion 36 of the plate 21 may freely move lengthwise within the channel 2 without contacting or interferring with the channel 2. Two shoulders 42, 43 are provided in the plate 21 adapted to engage the guide rails 40, 41 to prevent the plate 21 from rotating within the channel 2 when the rod 8 is rotated about its longitudinal axis. As can be readily seen, turning of the threaded rod 8 clockwise as viewed in FIG. 4 will cause the plate 21 to rotate clockwise until the left shoulder 42 engages the left guide rail 40, at which point the plate 21, with a cutting torch mounted thereto in the manner previously described, will cease rotating and will begin moving lengthwise within the channel 2 with the shoulder 42 sliding against the rail 40. Rotation of the threaded rod 8 counter-clockwise will cause the right shoulder 43 to engage the right guide rail 49 and the plate 21 with the cutting torch attached to move in the opposite direction lengthwise within the channel 2.

Referring again to FIG. 2, the bracket 11 is bent at 31 to provide an upward extending portion 32 having a bolt hole 33 therethrough and a plurality of indexing marks 34 is provided for matching with a mark 35 shown in FIG. 1 at the top-center of the rotatable plate 13 to obtain predictable and repeatable flame tip height adjustments.

Figure 5:
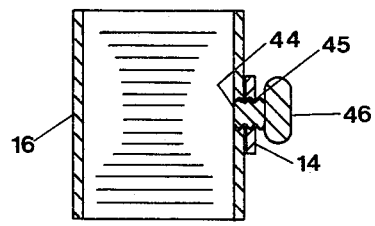
FIG. 5 is a cross-sectional view through a tiltable tubular member and horizontal support bar.

FIG. 5 is a cross-sectional view through a vetically mounted tiltable tube 16 and a horizontal support bar 14 to which it is attached. Thumb screw holes 44, 45 are provided through the tiltable tube 16 and the horizontal support bar 14 respectively. The tiltable tube 16 is seated against the horizontal support bar 14 with the two holes 44, 45 aligned, and is then rotated clockwise or counter-clockwise about the center axis of the thumb screw holes to achieve a desired cutting angle. A thumb screw 46 is inserted into the thumb screw holes 44, 45 to secure the tiltable tube 16 to the horizontal support bar 14. The cutting angle may be adjusted by loosening the thumb screw 46, changing the angle of the tiltable tube 16 relative to the horizontal support bar 14 and tightening the the thumb screw 46.

Figure 6:
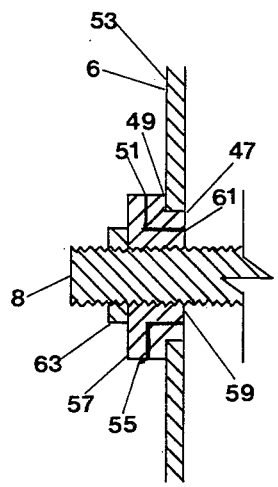
FIG. 6 is a cross-sectional view illustrating the mounting of a threaded rod within an end plate.

FIG. 6 illustrates the method for mounting the threaded rod 8 in the end plates 6, 7. Unthreaded holes 47, 48 larger in diameter than the diameter of the threaded rod 8 are provided in the end plates 6, 7. A brass bushing 49, 50 having a shoulder portion 51, 52 provided thereon is fitted into or otherwise mounted within each hole 47, 48 with the shoulder portion 51, 52 seated against the exterior surface 53, 54 of the end plates 6, 7. Also provided are a pair of internally threaded shoulder nuts 55, 56 having shoulder portions 57, 58 provided thereon which nuts 55, 56 are adapted to be threaded onto the threaded rod 8. The body portions 59, 60 of the nuts 55, 56 are adapted to be snuggly but rotatably inserted into holes 61, 62 extending lengthwise through the aforesaid bushings 49, 50. Also provided are a pair of jam nuts 63, 64 adapted to be threaded onto the rod 8 which nuts 63, 64 are seated against the shoulder portions 57, 58 of the shoulder nuts 55, 56 to prevent the latter from becoming loose during the operation of the guide 1.

In a preferred embodiment of my invention I provide a pair of interchangeable threaded rods 8. One of the said rods 8 is provided with 24 national fine threads per inch and is well adapted to be turned by an electric drill. The other of the said rods 8 is provided with sixteen national coarse threads per inch and is well adapted to be turned by hand.

To assemble a guide 1, brass bushings 49, 50 are inserted into the end plates 6, 7 in the usual way. One end of a rod 8 is inserted through a hole 61, 62 in a brass bushing 49, 50 mounted in an end plate 6, 7. The two rod support nuts 26, 30 are held by hand against the faces 24, 29 of the plate 21 while the plate 21 is rotated slightly about its vertical axis, inserted into the channel 2, and then rotated in the reverse direction until it is perpendicular to the longitudinal axis of the channel 2. While holding the nuts 26, 30 in the positions described, the rod 8 is threaded into the said nuts 26, 30 and inserted through the hole 62, 61 in the other brass bushing 50, 49 mounted in the other end plate 7, 6. A shoulder nut 55, 56 is threaded onto each end of the rod 8 with a body portion of each nut 55, 56 rotatably inserted in a hole 61, 62 in a brass bushing 49, 50 and with the shoulder 57, 58 of each shoulder nut 55, 56 seated against a shoulder 51, 52 of a bushing 49, 50. A jam nut 63, 64 is then threaded onto each end of the rod 8 to prevent the shoulder nuts 55, 56 from becoming loose during operation of the guide 1.

A threaded rod 8 may be quickly and easily removed by driving the torch holder assembly 9 to a position near one end of the channel 2, removing the jam nuts 63, 64, removing the shoulder nuts 55, 56, and disassembling the torch holder assembly 9 by further rotation of the rod 8.

Figure 7:
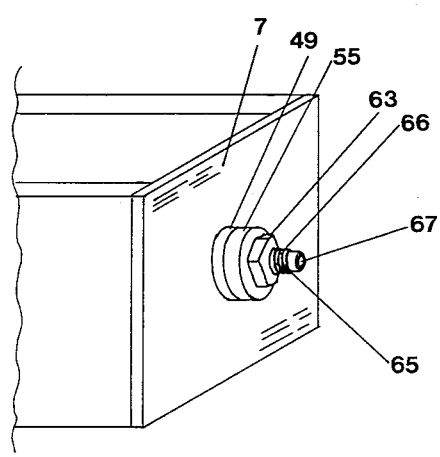
FIG. 7 is a view in perspective showing an end of a threaded rod adapted to be turned by a power drill.

FIG. 7 illustrates an end 65 of a rod 8 that extends outside an end plate 7 and is adapted to be grasped by the chuck of a power drill (not shown). The rod 8 is provided throughout its length with fine threads 66 as described above, except for a short smooth portion 67 thereof that is unthreaded and adapted in shape and size to be easily grasped by the chuck of a reversable power drill, which power drill may serve as a source of motive power for driving the torch holder assembly 9.

Figure 8:
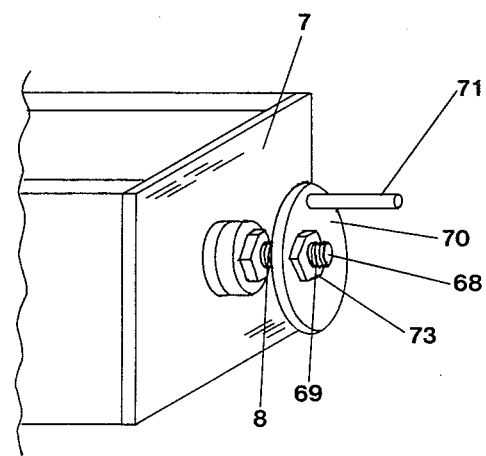
FIG. 8 is a view in perspective showing an end of a threaded rod adapted to be hand operated.

FIG. 8 illustrates an end 68 of a second threaded rod 8 that is provided throughout its length with coarse threads 69. A fly wheel 70 having a handle 71 attached thereto is held by a pair of nuts 72, 73 both of which are threaded onto the rod 8 and one of which is positioned on either side of the said fly wheel 70. A handle 71 adapted to be grasped in the hand of a person for manual operation of the torch holder assembly 9 is permanently attached to the fly wheel 70.

Having thus described by invention what I now claim is:

1. A cutting torch guide comprising an upward opening channel having two ends and having provided lengthwise thereon guide means adapted to engage a guide block wherein each of the said ends is closed by an end plate joined to the said channel and wherein each of the said end plates has provided therethrough a hole adapted to receive a bushing, a body portion of a shoulder nut, and a threaded rod inserted therethrough; a rod adapted to and extending lengthwise within the said channel and inserted and extended through the aforesaid holes in the aforesaid end plates and having provided thereon external threads adapted to engage a torch holder assembly and adapted to receive thereon a plurality of shoulder nuts and a plurality of jam nuts and being adapted at one end thereof to be coupled to a power source for rotational movement about the longitudinal axis thereof; connector means for detachably and rotatably coupling the aforesaid rod to the aforesaid end plates comprising a pair of bushings, a pair of shoulder nuts and a pair of jam nuts; and a torch holder assembly comprising a vertical plate having two opposing surfaces and having a hole therethrough adapted to receive the aforesaid rod inserted therethrough and adapted for reciprocating lengthwise movement within the said channel and adapted to engage the aforesaid guide means on the aforesaid channel and having provided on each of the said opposing surfaces thereof a nut-stop; a pair of nut-stops mounted on the aforesaid opposing surfaces of the aforesaid plate and adapted to engage a pair of rod support nuts mounted on the said rod and on opposite sides of the said plate and adapted to prevent the said nuts from rotating on the said rod and to prevent the said rod from making contact with the said plate; a pair of rod support nuts adapted to be threaded onto the aforesaid rod and adapted to engage the aforesaid nut-stops and to cooperate with the said nut-stops to prevent the said rod from coming into contact with the aforesaid plate; a torch support bracket mounted on the aforesaid guide block adapted to receive a rotatable plate means detachably coupled thereto and having provided thereon indexing means adapted for cooperation with indexing means on a rotatable plate means for adjusting the height of a cutting torch; plate means adapted to be detachably and rotatably coupled to the aforesaid bracket means and having provided thereon indexing means adapted to cooperate with the aforesaid indexing means on the aforesaid bracket means for adjusting the height of a cutting torch and having attached thereto a horizontal suppot bar adapted to receive a tubular means tiltably and detachably coupled thereto; connector means for detachably coupling the aforesaid rotatable plate means to the aforesaid torch support bracket; a tubular means tiltably and detachably coupled to the aforesaid horizontal bar means and adapted to receive a flame torch detachably mounted thereto; coupling means for tiltably and detachably coupling the aforesaid tubular means to the aforesaid bar means; and screw means mounted in the said tubular means and adapted to reversibly engage and hold a flame torch in the said tubular means.

* * * * *